United States Patent [19]

Rainey

[11] 4,185,464
[45] Jan. 29, 1980

[54] OCEAN TIDE ENERGY CONVERTER HAVING IMPROVED EFFICIENCY

[76] Inventor: Don E. Rainey, 4529 NE. 21st Ave., Ft. Lauderdale, Fla. 33308

[21] Appl. No.: 888,020

[22] Filed: Mar. 20, 1978

[51] Int. Cl.² .......................................... F03B 13/12
[52] U.S. Cl. ...................................... 60/496; 60/497; 417/333
[58] Field of Search .............................. 60/495–507; 290/42, 53; 417/330–333, 337

[56] References Cited

U.S. PATENT DOCUMENTS

| | | |
|---|---|---|
| 618,729 | 1/1899 | Reed . |
| 1,195,386 | 8/1916 | Mould . |
| 1,364,619 | 1/1921 | Dolliver . |
| 1,403,702 | 1/1922 | Melvin ............................... 60/496 |
| 1,502,901 | 7/1924 | Bristow . |
| 1,665,140 | 4/1928 | Master . |
| 2,470,312 | 5/1949 | Levin . |
| 2,935,024 | 5/1960 | Kofahl ............................ 60/496 X |
| 3,970,415 | 7/1976 | Widecrantz ..................... 60/496 X |

*Primary Examiner*—Allen M. Ostrager
*Attorney, Agent, or Firm*—Bacon & Thomas

[57] ABSTRACT

A tide motor useful for converting periodic rising and falling water levels to useful work such as electric power generation includes a primary piston having a large enclosed chamber that can selectively be filled with air for generation of upward thrust when submerged in rising tidal water or filled with water for generating downward gravitational thrust when the piston is suspended in air above a dropping tidal water level. Cyclic filling and emptying of the chamber is programmed to coordinate piston positions and water level positions, and the piston can be locked in either up or down position to achieve maximum flotation and gravitational thrust forces. An auxiliary tidal piston that can be locked in a down position has an upper water chamber provided with flood valves and an air filled, sealed flotation chamber below. The auxiliary piston is located near the primary piston, and is designed to have positive buoyancy when its respective chambers are filled with water and air. The lower area of the water chamber of the auxiliary piston is connected to the lower area of the primary piston chamber by a valve conduit so the primary piston chamber can be filled with water at its high position while it is locked up by releasing the auxiliary piston to float upwardly with its water chamber filled, and placing the primary and auxiliary piston chambers in communication with each other so water flows from the latter into the former until the primary piston chamber is filled with water before it begins its downward stroke after the water level has dropped below it. After the primary piston has completed its downward stroke, its interior chamber is drained and sealed in preparation for its next upward stroke on the next rising tide, and the water chamber of the auxiliary piston is refilled in preparation for the next cycle of operation.

8 Claims, 6 Drawing Figures

OCEAN TIDE ENERGY CONVERTER HAVING IMPROVED EFFICIENCY

BACKGROUND OF THE INVENTION

This invention is in the field of tide motors adapted to generate electrical energy.

CROSS REFERENCE TO RELATED APPLICATIONS

This application discloses subject matter related to subject matter disclosed in co-pending U.S. application Ser. No. 813,325, filed July 6, 1977 by DON E. RAINEY, applicant named in the present application. The disclosure contained in the earlier application is incorporated herein by reference.

FIELD OF THE INVENTION

Tidal motors for converting the natural rise and fall of ocean tides into useful work are generally known for use in generating electrical energy as well as other applications. Such prior art systems are known to use floats that rise and fall with the periodic change in level of tidal waters and to use the reciprocating motion of the float as input energy to a motor of some sort that may drive, for example, an electrical generator or alternator. The motor itself may be hydraulic, pneumatic or mechanical in nature and very often some form of energy storage system is provided to insure constant flow of power between the changes of tide.

While it is also generally recognized that a large hollow float can be used to generate an appreciable upward buoyant force that can be put to use for work, the prior art has failed to deal effectively with a system for obtaining a large force on the downward stroke of such a float mechanism. In some instances, the upward movement of a float mechanism is used to elevate a volume of water that can be used to fill a chamber that can be lowered in air to produce energy during the downward movement of the mass of water. In still other systems, a pump is used to fill a chamber that performs as a float on the upward stroke and as a weight on the downward stroke.

In applicant's co-pending application referenced above, a tide motor energy source is disclosed as including a valved chamber in a reciprocating type piston that, depending upon whether the chamber is filled with air or water, can function as a sumberged, buoyant body to generate work on its upward stroke, or as a large mass suspended in air to gravitationally produce work on its downward stroke. The chamber is cyclically filled with air or water at its lower and upper positions, respectively and is connected to an hydraulic ram that converts the reciprocating motion of the tidal piston to hydraulic pressure that in turn is used to drive a motor connected to an electrical generator. The piston can be locked at either extremity of its motion so it can be released when the water level is at a predetermined desired elevation relative to the piston and to enable the piston to be filled with water at its upper position. In accordance with the earlier application, the chamber of the piston is simply flooded with water at its upper end by opening flood valves that are closed once the chamber is filled with water. This requires that the upper end of the chamber cannot be allowed to rise above the surface of the water at the high tide level so that complete filling of the chamber is insured.

It has been found by applicant that the efficiency of the earlier tide motor can be improved by providing a means for filling the tidal piston even though the piston is allowed to float substantially higher than the surface of the water at the high tide level. This improves the efficiency of the tide motor by allowing the piston to operate over a longer stroke for any change in water level.

The present invention deals with an improved arrangement of tide motor whereby the work producing piston can be automatically filled at its upper stroke limit even though it is floating above the surface of water at high tide.

SUMMARY OF THE INVENTION

This invention is a tidal energy harnessing system using a tidal piston basically similar to that disclosed in applicant's co-pending application referenced above. Accordingly, one or more primary pistons arranged to produce useful work is each provided with a large hollow chamber that can selectively be filled with water or air and sealed against the ambient. The primary piston starts its cycle of operation at a locked down lower position at low tide with the bottom of the chamber substantially level with the surface of the body of water in which it is supported. As the tide water rises above the upper end of the chamber, the piston is released and the upward buoyant force of the piston is used to produce work. Since a substantial volume of water is displaced by the air chamber of the primary piston, a very large upward force is available to produce work. Preferably, the piston is connected to a hydraulic ram filled with hydraulic fluid so that the motion of the piston is converted to hydraulic pressure which can be utilized to drive an electrical generator through an hydraulic motor. The rate of upward motion of the piston, of course, is controlled so that the piston stays submerged during most of its upward stroke, but at the upper end of its stroke, the piston is allowed to rise to its free floating level just as the tide reaches its full flood level. In this position, the lower end of the air chamber of the primary piston is about level with the surface of the water at high tide.

The primary piston must now be filled with water in preparation for its down stroke, which, as disclosed in the previous application, occurs while the piston is filled with water and suspended in air above the surface of the water during an outgoing tide. To achieve filling of the chamber of the primary piston, this invention proposes the use of an auxiliary, water lifting tidal piston that includes a water chamber and a sealed, flotation chamber. The flotation chamber is designed to provide sufficient buoyancy so that the auxiliary piston is positively buoyant when the water chamber is filled with water. The water chamber of the auxiliary piston connected to the chamber of the primary piston by means of a flexible fluid line or the like that includes one or more shut-off valves to control the flow of water through the conduit. The volume of the water chamber in the auxiliary piston is substantially the same or more than the volume of the chamber in the primary piston. The auxiliary piston is also provided with a locking mechanism for locking it in its lower end of stroke at lower tide so that the water chamber can be filled by opening flood valves located in the lower area of the water chamber during a rising tide.

Upon the primary piston reaching its approximate upper position, a locking mechanism is engaged to hold the primary piston at its maximum upper level. At some predetermined time before that moment, the auxiliary piston is released (after the flood valves are closed) to rise to the surface of the tidal water at high tide. The water chamber of the auxiliary piston rises above the surface of the water and is placed in communication with the interior of the chamber of the primary piston by opening the shut-off valve or valves in the fluid line connecting the two chambers. Since the level of water in the auxiliary piston will be higher than the lower end of the chamber in the primary piston, water from the auxiliary piston will begin to flow into the chamber of the primary piston. Since the auxiliary piston will become lighter, it will float higher and higher in the water so that the chamber in the primary piston continues to be filled while it is locked in its upper position. The auxiliary piston is supported so that it can rise to a sufficient level so that the bottom of the water chamber is approximately level with the upper end of the chamber in the primary piston to insure that the primary piston will be filled with water.

As the tide begins to flow out, the valve in the fluid line between the pistons is closed and the auxiliary piston simply floats down with the outgoing tide. When the level of the water is below the bottom of the water filled primary piston, the piston is released to drop slowly to gravitationally produce work during its down stroke. Since a large quantity of water is contained within the chamber of the primary piston, a substantial amount of energy is available to produce work during the downward stroke of the piston.

Upon the primary piston reaching its lower limit of motion, and this will be timed to coincide with the tide water reaching its ebb level, flood valves in the primary piston are opened to drain the water out of the piston and are closed up again to seal out water once the chamber is empty. The primary piston is locked in its down position again at low tide and is now ready for its next cycle of operation. The auxiliary piston, meanwhile, also has floated down to its lower level and has been locked in place in that position with its valves open. As the tide comes in and the water level rises, the water chamber in the auxiliary piston is progressively filled to prepare it for its next cycle of operation.

The described cycle is repeated so that useful work is produced on both the upward and downward stroke of the primary piston. The invention is particularly innovative over all prior art tide motors in that a large vertically directed force is obtained both on a rising tide and an outgoing tide by means of a mechanically simple system utilizing virtually no external energy except for system control purposes. The generation of power utilizing such a system is limited only by the structural load limit of the system components. The technology of the hydro-electric system connected to the primary piston involves basic state of the art knowledge so that the invention is immediately available for the generation of low cost electrical power by converting readily available tidal and gravitational energy to electrical energy using nothing more than structurally simple valved tidal pistons connected by a hose and provided with locking devices and control circuits for timing the locking and releasing of the piston and operation of the valves.

A specific preferred embodiment of the invention is illustrated in the drawings appended to the application and is disclosed in detail in the following description of such embodiment.

DETAILED DESCRIPTION OF A PREFERRED EMBODIMENT

Description of the Drawings

With reference to the drawings attached to and forming part of this application.

DETAILED DESCRIPTION

Figure 1:
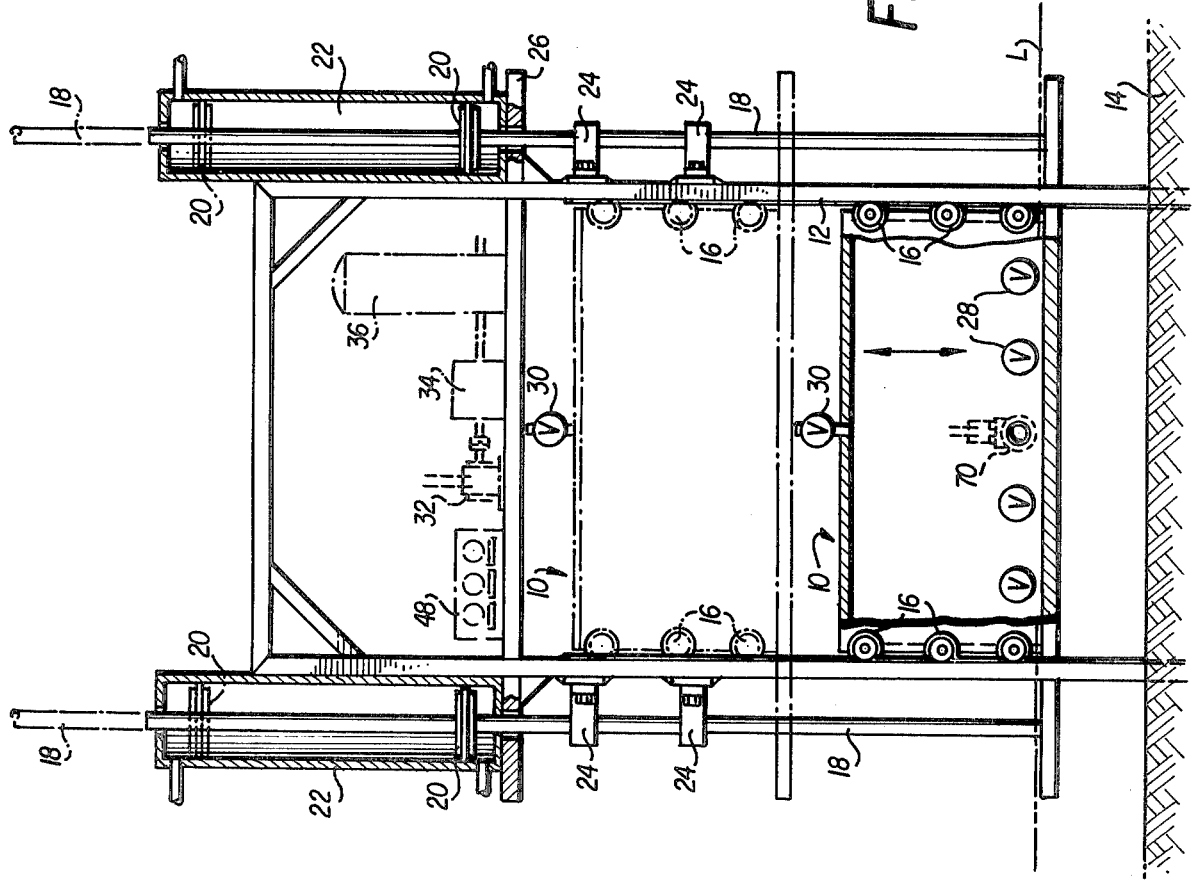
FIG. 1 is an side elevational view showing the primary tidal piston of the present invention and its associated structure, with the piston at its ebb tide position.
Figure 3:
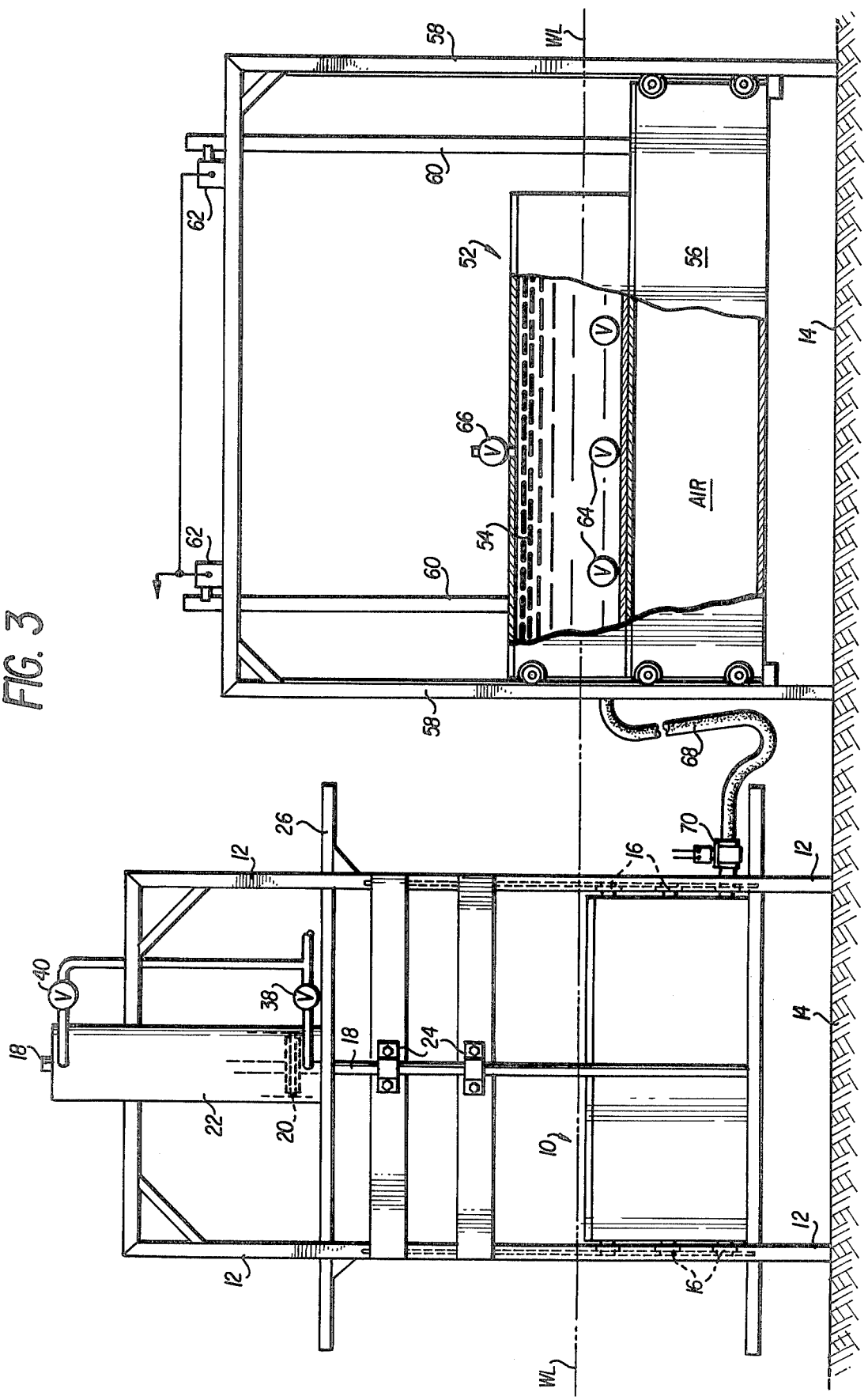
FIG. 3 is a front elevational view showing the primary and auxiliary tidal pistons of the system in their locked down positions during an incoming tide.

With reference to FIGS. 1 and 3, a primary tidal piston 10 is supported and guided for vertical movement only along vertical structural elements 12 of a structural framework set into the ground 14 beneath a body of tidal water having an ebb tide level L. Suitable guide wheels 16 are provided to minimize friction between the piston 10 and vertical elements 12.

Piston rods 18 are rigidly connected to piston 10 at their lower ends and to hydraulic ram pistons 20 at their upper ends. The ram pistons 20 are disposed in ram cylinders 22 normally filled with hydraulic fluid and forming part of the hydro-electric power generating systems to be described below. Piston rod guides 24 attached to the structural support framework serve to guide piston rods 18 during their vertical strokes. Cylinders 22 are supported on platform 26 mounted on the structural support framework that includes the vertical members 12.

While any suitable number of hydraulic ram cylinders could be used, only two are illustrated for the sake of simplicity.

Flood valves 28 and air vent valves 30 enable the otherwise sealed hollow piston 10 to communicate with the ambient, which, at least insofar as flood valves 28 are concerned, may be air or water, depending upon the surface level of the tidal water. Thus, flood valves 28 enable the piston 10 to be drained when the surface of tidal water is below or level with the valves, and to be filled with water when the water surface is at least level with the top of the air chamber of piston 10. The valve may be remotely controlled for electric, hydraulic, or pneumatic operation in any manner known in existing valve control technology.

Figure 2:
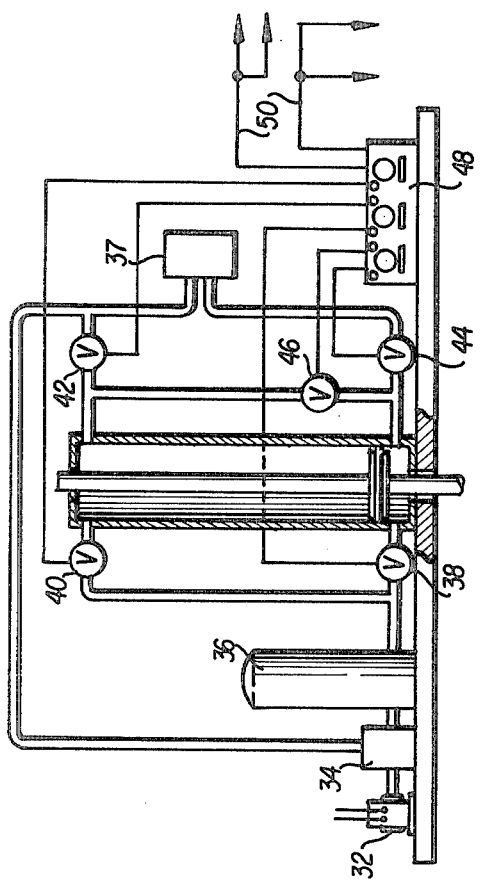
FIG. 2 is a schematic view representative of the hydroelectric system associated with the primary tidal piston.

A hydraulic-electric power generating system suitable for use with this invention is shown in phantom lines in FIG. 1 and is represented schematically in FIG. 2. This system is essentially the same as that disclosed in the co-pending application referenced at the beginning of the present specification.

Hydraulic ram cylinder 22 is full of hydraulic fluid so that hydraulic pressure is generated when the ram piston 20 is displaced in either direction by the tidal piston.

The size of the hydraulic ram unit would be carefully selected to enable the generation of a suitable pressure in the hydraulic fluid that can be utilized to drive an electromotive generator or alternator 32 through hydraulic motor 34. A pressure accumulator 36 can be charged while the ram piston 20 is moving so that the motor 34 can be continuously driven even when the piston 20 is stopped at its stroke ends. An hydraulic fluid supply reservoir 37 is included in the hydraulic system, as is conventional.

When the tidal piston is released for upward movement, with its internal chamber filled with air, the ram piston 20 is driven upwardly with a force equivalent to the tremendous weight of water displaced by the tidal piston 10, less the weight of the structure connected to the piston. In the system illustrated in FIG. 2, control valves 38 and 42 would be closed and valves 40 and 44 opened to enable the flow of hydraulic fluid from above the piston 20 into accumulator 36 and onward to motor 34 and thence back to the ram cylinder below the piston 20. Valve 46 is a pressure relief valve and is normally always closed except to relieve excess pressure in the ram system.

When the primary piston 10 reaches its upper end of stroke (shown in phantom lines in FIG. 1), ram piston 20 likewise reaches its upper end of stroke, whereupon valves 38, 40, 42 and 44 are closed to thereby hydraulically lock the ram piston and the primary tidal piston at their upper positions.

When the tidal piston is to be released, valves 38 and 42 are opened to enable hydraulic fluid to be supplied to accumulator 36 and motor 34. The various flow rates of hydraulic fluid are chosen so motor 34 is adequately supplied while the tidal piston slowly drops while suspended in air above the level of receding tide water, with the piston, of course, filled with water. Since the tidal piston now is a large weight mass, the gravitational force available for driving ram piston 20 in a downward direction will be the equivalent of the weight of the water contained in the tide piston plus the weight of the piston assembly. A central control unit 48 can be arranged to control the various valves 28, 30, 38, 40, 42 and 44 automatically and cyclically, as well as other system components. Suitable sensors (not illustrated) could be incorporated in the system for providing the central control unit with signals indicative of various conditions in the system. The leads 50 represent interface connections between control unit 48 and the various valves in the tidal piston as well as the auxiliary piston, to be yet described in detail.

Referring now to FIG. 3, an auxiliary tidal piston 52 includes a water chamber 54 above an air flotation chamber 56. The piston 52 is supported and guided for vertical movement by the vertical members 58 of a structural framework supported on the ground 14. Vertical rods 60 extend upwardly from auxiliary piston 52 and locking devices 62 are provided for retaining the auxiliary piston at its lower position while the water level rises during an incoming tide.

The air chamber 56 is normally sealed closed but water chamber 54 has flood valves 64 that can allow flooding of chamber 54 during a rising tide while the piston 52 is locked down. An air vent valve 66 lets air escape while chamber 54 is filling with water or lets air into the chamber when it is being drained.

One or more hoses or other suitable fluid lines 68 connects the lower end of water chamber 54 with the lower area of the interior of the primary piston 10. A valve 70 can be remotely controlled to enable or block flow through hose 68.

In operation, at the beginning of an operating cycle, primary piston 10 is locked down by hydraulically locking ram piston 20 in its cylinder 22. The interior chamber of piston 10 is full of air and the valves 28 and 30 (FIG. 1) are closed. The tide is at ebb and the water surface level is at L (FIG. 1). The auxiliary piston 56 (FIG. 2) is locked down, the water chamber 54 is empty, and the flood valves 64 are open. Valve 7 (FIG. 3) in fluid line 68 is closed.

When the surface of water rises approximately to level WL in FIG. 3 due to incoming tidal flow, that is, when the primary piston 10 is submerged to a desired extent, valves 40 and 44 (FIG. 2) are opened to unlock the hydraulic ram piston 20 whereupon piston 10 rises within and with the body of water in which it is immersed. Auxiliary piston 52 is held locked down at least till the chamber 54 is filled with water through flood valves 64. Auxiliary piston 52 is designed to have positive buoyancy when it is released even with the chamber 54 filled with water. The design parameters of the auxiliary piston are calculated so that the piston will slowly rise when it is released so that the water chamber 54 will surface by a predetermined amount at high tide.

Figure 4:
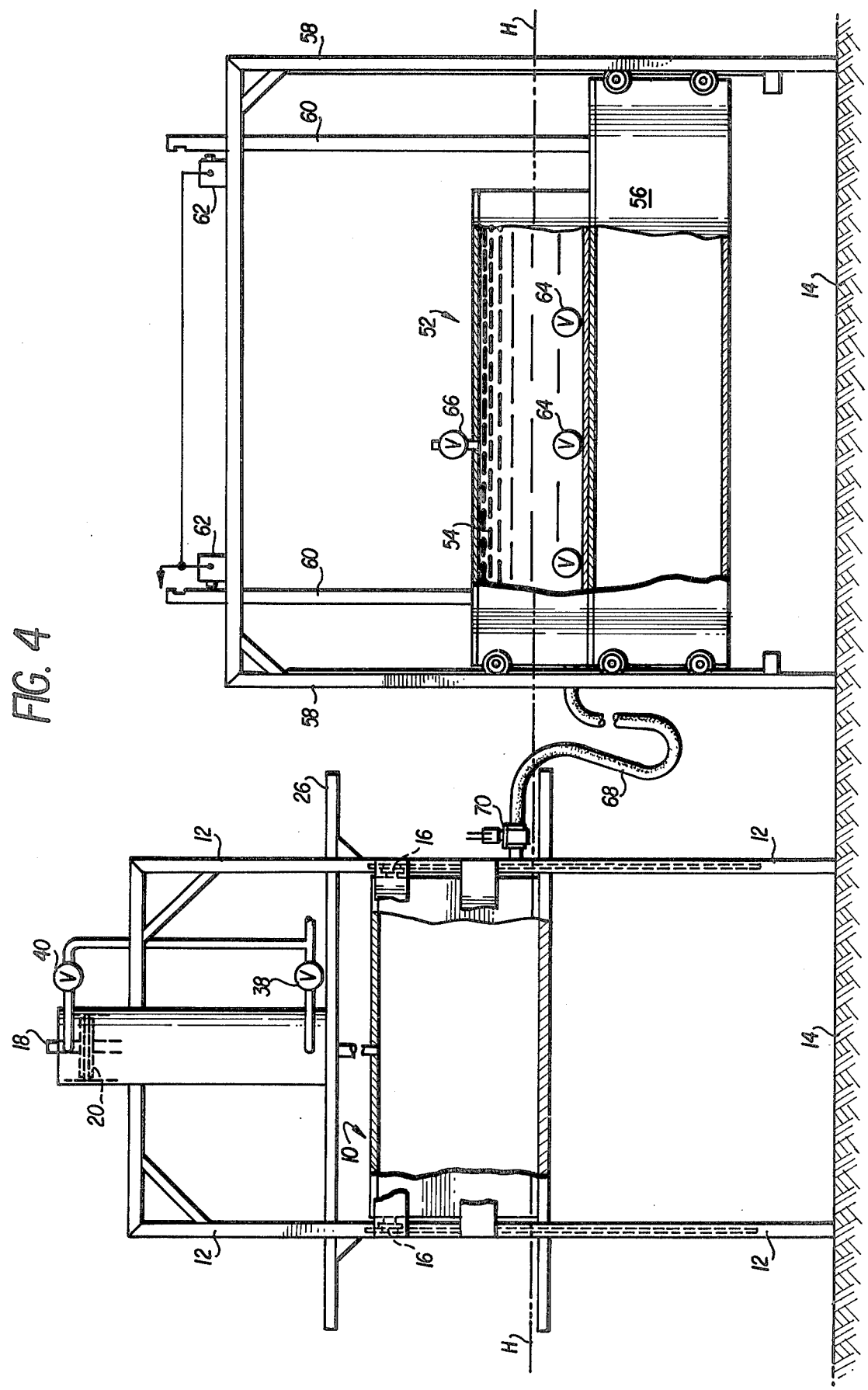
FIG. 4 is similar to FIG. 3 and illustrates the primary piston at its high tide position, and the auxiliary piston at an intermediate rising position.
Figure 5:
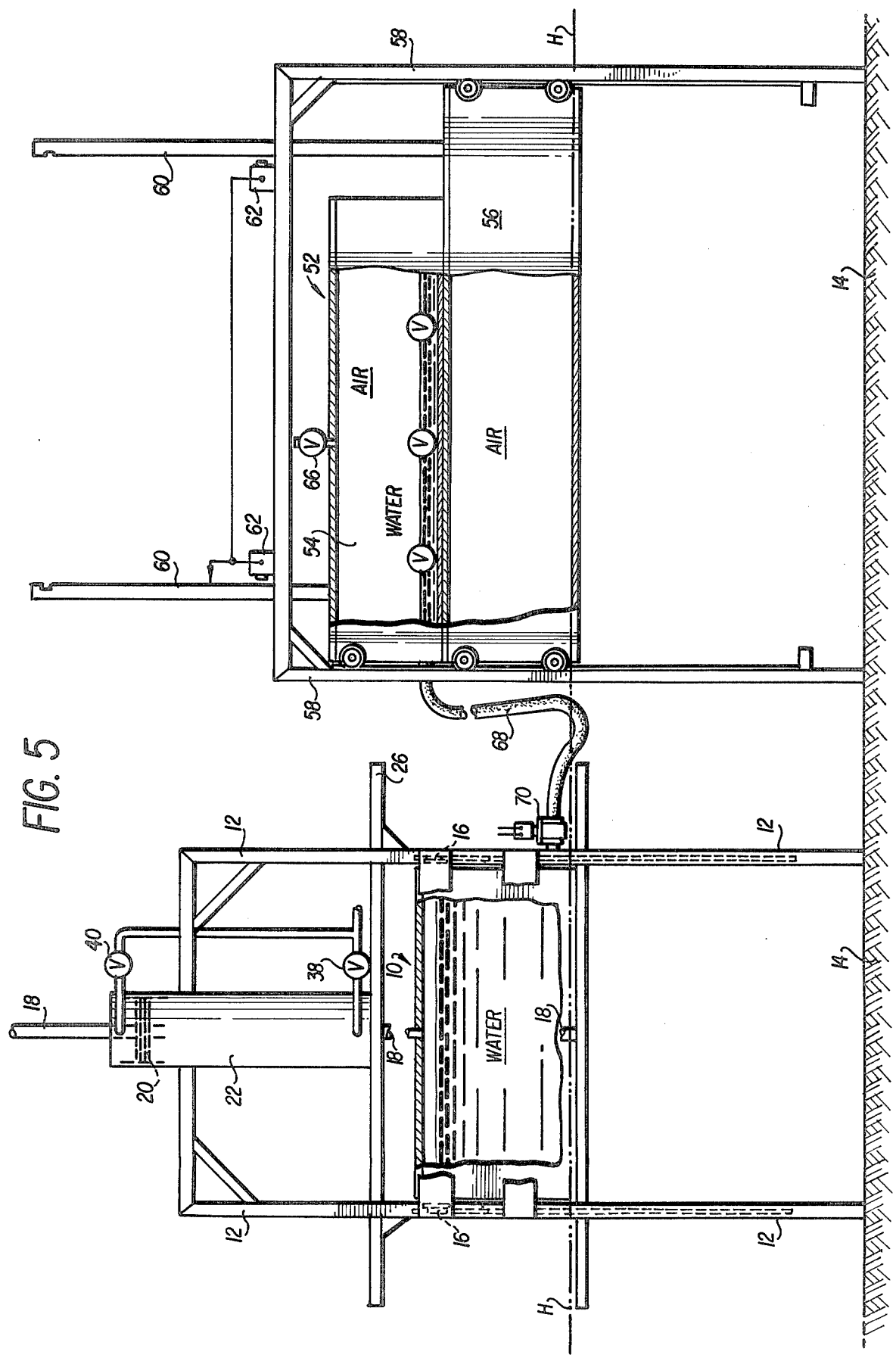
FIG. 5 shows the system with the primary piston in its locked up high position and filled with water.

The primary piston 10 will eventually reach its upper limit of motion as shown in FIG. 4 about when the surface of water is at level H corresponding to its high tide level. The ram piston 20 is again hydraulically locked by closing the valves 38, 40, 42 and 44 (FIG. 2). The water chamber 54 of auxiliary piston 52 has by now surfaced and a head of water pressure exists between chamber 54 and the interior of primary piston 10. Valve 70 is now open and water flows through hose 68 into piston 10. Auxiliary piston 52 floats higher and higher as the water in chamber 54 drains into piston 10 until, as shown in FIG. 5, piston 10 is substantially completely filled with water. Valve 70 is closed again and piston 10 is held in its elevated position until the water surface drops below it a suitable distance. Auxiliary piston 52 floats downwardly with the lowering water surface during the outgoing tide.

Figure 6:
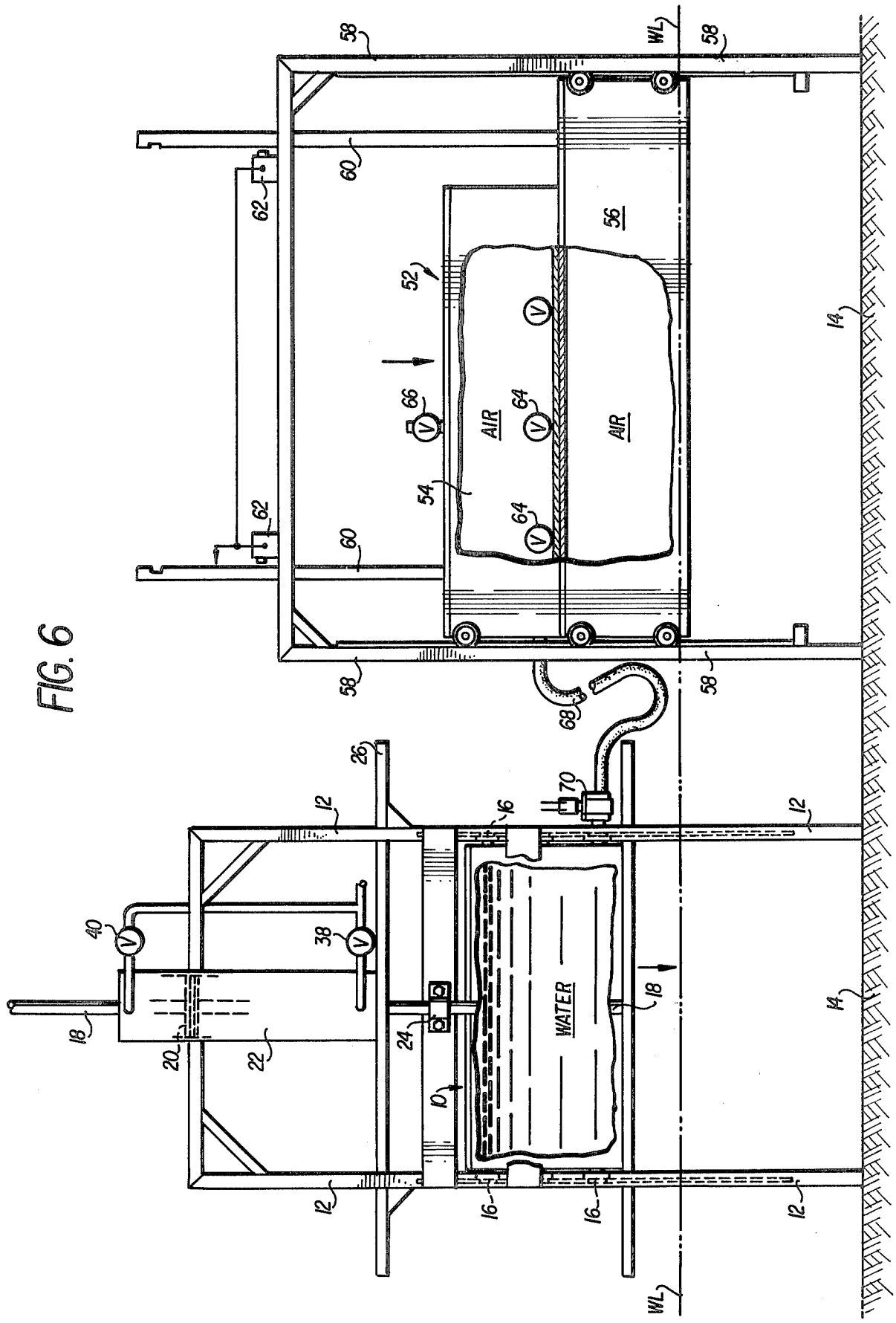
FIG. 6 shows the system with the primary piston on its downward stroke while suspended above the surface of an outgoing body of tidal water.

At some point, piston 10 is released for its downward stroke by opening of valves 38 and 42 (FIG. 2), whereupon the large mass of water begins to drop under the influence of gravity to generate a downward force on a ram piston 20. The rate of decent of piston 10 is carefully controlled and governed so that it moves at a rate such that the piston remains above the surface of the tidal water during the outgoing tide until the tide is at ebb. FIG. 6 illustrates piston 10 during its downward stroke, with water level WL at some elevation between high and low tide levels.

As piston 10 approaches its lower limit of travel, at which position the bottom of the water filled chamber in piston 10 lies just about even with the surface of water L at low tide (FIG. 1) flood valves 28 are opened to drain piston 10 of water and the piston is again locked in its down position at ebb tide. Auxiliary piston 52 likewise is locked down in its bottom position with valves 64 open (FIG. 3). The system is now ready for its next cycle of operation during the next tidal cycle.

The above described embodiment is exemplary only and it is not intended to limit the scope of the invention beyond what is claimed below. Various design and structural modifications to the exemplary system can readily be made by technicians skilled in the relevant field of technology without changing the scope of the invention.

What is claimed is:

1. A tide motor comprising
a primary piston including an enclosed chamber;
valve means for selectively providing communication between the lower area of the chamber and the ambient;
means connected to the primary piston arranged to convert motion of the primary piston to useful work;
locking means arranged to selectively lock the primary piston at lower and upper positions;
an auxiliary piston including a lower enclosed air chamber and an upper water chamber having a volume at least as great as the volume of the primary piston chamber, the air chamber being sufficiently large so that the auxiliary piston is positively buoyant when the water chamber is filled with water;
flood valves in the lower area of the water chamber;
means for selectively locking the auxiliary piston in its lower position;
fluid conduit means connected to and providing communication between the lower areas of the chamber of the primary piston and the water chamber of the auxiliary piston;
a valve means in the conduit means for selectively enabling or shutting off the flow of liquid in the conduit;
the primary and auxiliary piston being supported and guided for vertical movement in the environment of a body of tidal water; and
means for selectively controlling all of the recited locking and valve means.

2. The tidal motor according to claim 1, including an hydraulic-electrical energy generation system comprising an hydraulic ram cylinder unit having a piston and a piston rod moveable by the primary piston, and wherein said locking means comprises means for selectively hydraulically locking this ram piston within the cylinder.

3. The tide motor according to claim 1, wherein the locking means for the primary piston comprises an hydraulic system having an element connected to the primary piston, which element can be hydraulically locked against movement.

4. A tide motor according to claims 1 or 2, said primary piston and its associated chamber being constructed and dimensioned to displace a quantity of water sufficient to provide a buoyancy for the primary piston that enables same to float upon the surface of a body of water with the majority of the primary piston chamber above the surface of the water.

5. Apparatus according to claim 4, including means for remotely selectively actuating all of the recited valve and locking means.

6. A method for producing useful work using an energy source comprising a periodic rising and falling level of tidal water including (a) supporting a primary piston with an enclosed chamber for free floating vertical movement in a body of tidal water, the chamber, when filled with air, providing sufficient buoyancy for the primary piston such that its chamber floats at least in part above the surface of the water when the piston is free floating;

(b) supporting an auxiliary piston with a water chamber and an air chamber for free floating vertical movement in the same body of tidal water, the air chamber displacing sufficient water so the auxiliary piston has positive buoyancy even when the water chamber is filled with water, the water chamber having flood valves and the volume of the water chamber being at least as great as the volume of the primary piston chamber;

(c) connecting by means of a fluid conduit having a selectively controllable shut off valve means associated therewith the lower area of the primary piston chamber and the lower area of the auxiliary piston water chamber;

(d) filling the chamber of the primary piston with air, sealing the chamber and locking the primary piston in a lower position at ebb tide;

(e) locking the auxiliary piston at a lower position and opening the flood valves at ebb tide;

(f) releasing the primary piston for upward flotation after the surface of the body of water is above the primary piston chamber;

(g) using the forces generated by the upward flotation of the primary piston to perform useful work by connecting the primary piston to a work producing device;

(h) sealing the water chamber of the auxiliary piston after the water level has risen to the top of the water chamber and the same has been filled with water, and releasing the auxiliary piston for upward flotation;

(i) locking the primary piston against vertical motion when the tide is high and the primary piston has floated to its maximum elevation at said high tide with its chamber disposed at least in part above the surface level of the body of water;

(j) opening the valve in the fluid conduit connecting the chamber of the primary piston and the water chamber of the auxiliary piston so water flows from the latter into the former and substantially fills the former while the tide is high;

(k) releasing the primary piston with its water filled chamber for controlled descent after the level of the body of water has dropped below the chamber of the primary piston during an outgoing tide, the rate of decent being controlled so the primary piston stays above the water surface while the tide is outgoing;

(l) using the mass of the primary piston and its water filled chamber to produce useful work by connecting the dropping piston to a work producing device;

(m) allowing the primary piston to drop only until the lower area of its respective chamber is substantially at the level of the surface of the body of water at ebb tide and then locking the piston against vertical movement;

(n) opening the primary piston chamber to ambient at its lower area to drain the chamber of water and sealing the chamber when the water is replaced with air;

(o) allowing the auxiliary piston to freely float down to a lower position at low tide and reopening the flood valve means in the water chamber; and (p) repeating steps (f) through (o) during each tidal cycle.

7. The method according to claim 6, wherein said work producing devices recited in steps (g) and (l) comprises an hydraulic ram capable of generating hydraulic pressure and an hydraulic motor-electrical generator adapted to use the hydraulic pressure generated by the ram to produce electrical energy when the primary piston moves vertically.

8. The method according to claim 6, wherein the primary piston is allowed to float up on its upward stroke so that its bottom is substantially at the level of the water surface at high tide and the auxiliary piston is provided with sufficient flotation such that the bottom of the water chamber is approximately level with the top of the primary piston chamber when the latter is in locked up condition and the auxiliary piston is free floating with its water chamber substantially empty.

* * * * *